US011736984B2

(12) United States Patent
Nguyen et al.

(10) Patent No.: US 11,736,984 B2
(45) Date of Patent: Aug. 22, 2023

(54) RESOURCE RESERVATION SIGNALING FOR APERIODIC RESERVATIONS

(71) Applicant: QUALCOMM Incorporated, San Diego, CA (US)

(72) Inventors: Tien Viet Nguyen, Bridgewater, NJ (US); Gabi Sarkis, San Diego, CA (US); Kapil Gulati, Belle Mead, NJ (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 17/228,565

(22) Filed: Apr. 12, 2021

(65) Prior Publication Data

US 2021/0360481 A1 Nov. 18, 2021

Related U.S. Application Data

(60) Provisional application No. 63/025,911, filed on May 15, 2020.

(51) Int. Cl.
*H04W 28/26* (2009.01)

(52) U.S. Cl.
CPC .................................. *H04W 28/26* (2013.01)

(58) Field of Classification Search
CPC ...... H04W 28/26; H04W 72/08; H04W 88/08; H04W 76/00
See application file for complete search history.

(56) References Cited

U.S. PATENT DOCUMENTS

| | | | |
|---|---|---|---|
| 2019/0123869 A1* | 4/2019 | Kakishima | H04L 5/0048 |
| 2019/0313375 A1* | 10/2019 | Loehr | H04W 72/04 |
| 2020/0029340 A1* | 1/2020 | He | H04W 72/10 |
| 2021/0227517 A1* | 7/2021 | Yi | H04W 72/0453 |
| 2022/0232549 A1 | 7/2022 | Yeo et al. | |
| 2022/0312401 A1* | 9/2022 | Zhang | H04L 5/0005 |
| 2022/0400484 A1* | 12/2022 | Lee | H04W 72/0446 |

* cited by examiner

*Primary Examiner* — Hassan A Phillips
*Assistant Examiner* — Prenell P Jones
(74) *Attorney, Agent, or Firm* — Procopio, Cory, Hargreaves & Savitch LLP

(57) ABSTRACT

A method or apparatus for wireless communication at a wireless device. The wireless device transmits sidelink control information (SCI) indicating an aperiodic resource reservation and indicating a time gap between aperiodic resource reservations based at least in part on supplemental bits. The apparatus transmits a sidelink message based on the aperiodic resource reservation on a resource pool that supports periodic resource reservation.

28 Claims, 11 Drawing Sheets

RESOURCE RESERVATION SIGNALING FOR APERIODIC RESERVATIONS

CROSS REFERENCE TO RELATED APPLICATION(S)

This application claims the benefit of U.S. Provisional Application Ser. No. 63/025,911, entitled "Resource Reservation Signaling for Aperiodic Reservations" and filed on May 15, 2020, which is expressly incorporated by reference herein in its entirety.

BACKGROUND

Technical Field

The present disclosure relates generally to communication systems, and more particularly to sidelink communication such as vehicle-to-everything (V2X) or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X and/or other D2D communication. There exists a need for further improvements in V2X and/or other D2D technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. The apparatus transmits sidelink control information (SCI) indicating an aperiodic resource reservation and indicating a time gap between aperiodic resource reservations based at least in part on supplemental bits. The apparatus transmits a sidelink message based on the aperiodic resource reservation on a resource pool that supports periodic resource reservation.

In another aspect of the disclosure, a method, a computer-readable medium, and an apparatus are provided for wireless communication. The apparatus receives SCI indicating an aperiodic resource reservation and indicating a time gap between resources for the aperiodic resource reservation based at least in part on supplemental bits. The apparatus excludes resources of the aperiodic resource reservation from a set of candidate resources.

In another aspect of the disclosure, a method, a computer-readable medium, and an apparatus are provided for wireless communication. The apparatus transmits SCI indicating a resource reservation. The apparatus indicates, in the SCI, that the resource reservation is aperiodic and indicates, in the SCI, a time gap between aperiodic resource reservations based at least in part on supplemental bits.

In an aspect of the disclosure, a method, a computer-readable medium, and an apparatus are provided for wireless communication. The apparatus receives SCI indicating a resource reservation. The apparatus determines that the resource reservation is aperiodic and determines a time gap between resources for the aperiodic resource reservation based at least in part on supplemental bits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
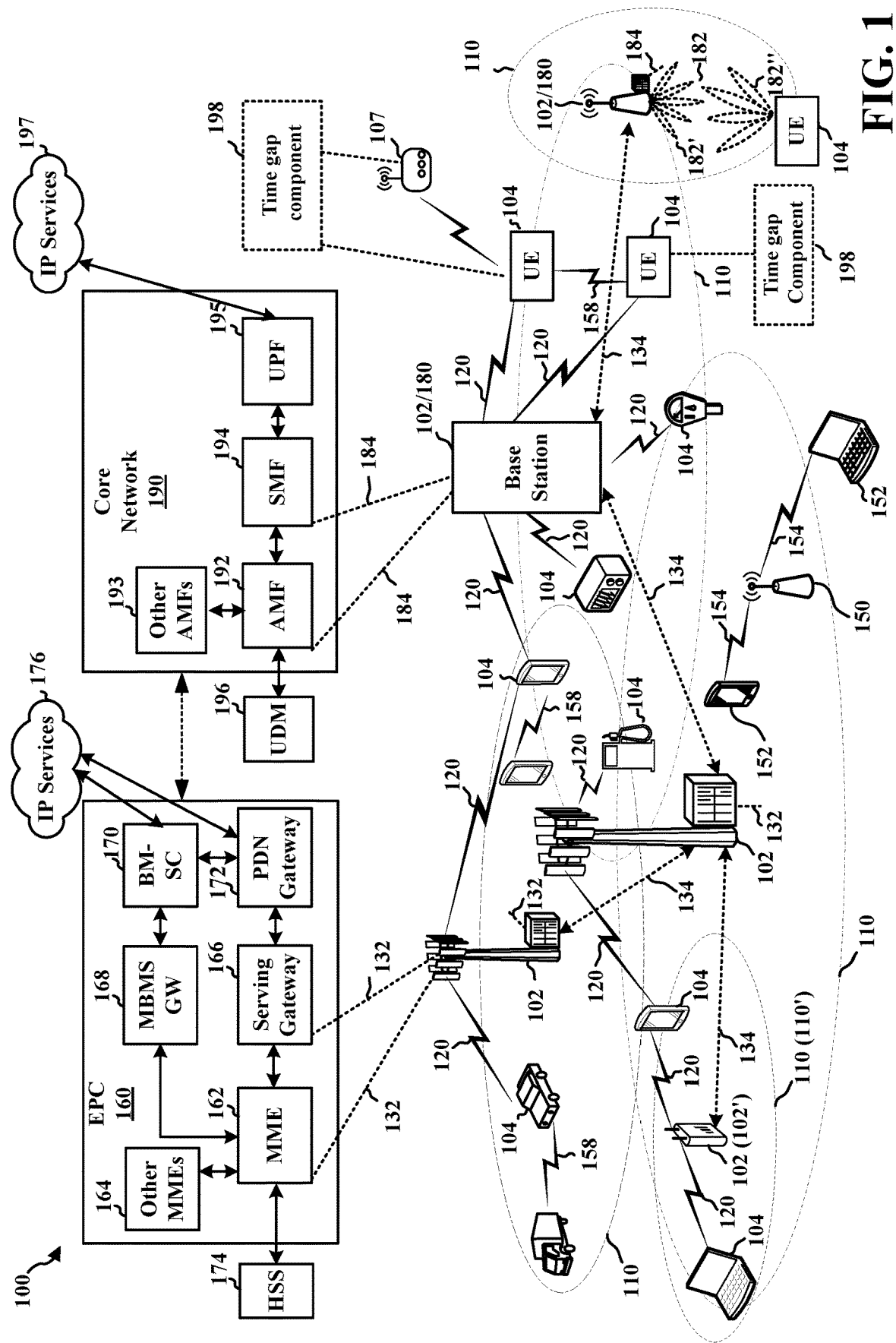
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur.

Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Sidelink device may transmit a reservation of resources for sidelink transmissions. The reserved resources may be indicated in sidelink control information (SCI). A number of bits in the SCI may be used to indicate a time gap between reserved resources. The number of bits may limit the length of a time gap that can be indicated between reserved resources. Aperiodic reservations may indicate the time gap in a number of slots, and may have a length limit based on the number of bits of the indication, e.g., up to 32 slots. Periodic reservations may indicate the time gap in ms in addition to a slot based reservation, e.g., up to 1000 ms. The time during which a UE performs resource selection, prepares a packet for transmission, and processes feedback in order to determine whether to transmit a retransmission in a reserved resource may be a significant amount of time relative to the length of a time gap that can be signaled for an aperiodic resource reservation.

Aspects presented herein improve time gap signaling for aperiodic resource reservation by using SCI bits that support information about periodic reservations to provide supplemental bits for signaling the time gap between aperiodic resource reservations. The use of additional bits to signal the time gap for aperiodic resource reservations may enable longer lengths of time gaps to be signaled, e.g., beyond 32 slots.

FIG. 1 is a diagram illustrating an example of a wireless communications system and an access network 100. Some wireless communication may be based on sidelink. As one example, sidelink may include vehicle-based communication from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may include other device-to-device (D2D) communication. D2D communication may include Proximity Services (ProSe), etc.

Referring again to FIG. 1, in certain aspects, a UE 104, e.g., a transmitting Vehicle User Equipment (VUE) or other UE, may be configured to transmit sidelink messages directly to another UE 104. The sidelink communication may be based on V2X or other D2D communication, such as Proximity Services (ProSe), etc. Sidelink communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

In some examples, the UE 104 may transmit SCI indicating a resource reservation. The UE 104 may include a time gap component 198 configured to indicate, in the SCI, that the resource reservation is aperiodic and to indicate, in the SCI, a time gap between aperiodic resource reservations based at least in part on supplemental bits. In other examples, the time gap component may be configured to receive SCI from other UEs 104 and to determine that the resource reservation is aperiodic and determine a time gap between resources for the aperiodic resource reservation based at least in part on supplemental bits.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include an eNB, gNodeB (gNB), or other type of base station. Some base stations 180, such as a gNB may operate in a traditional sub 6 GHz spectrum, in millimeter wave (mmW) frequencies, and/or near mmW frequencies in communication with the UE 104. When the gNB, e.g., base station 180, operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., base station 180, may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
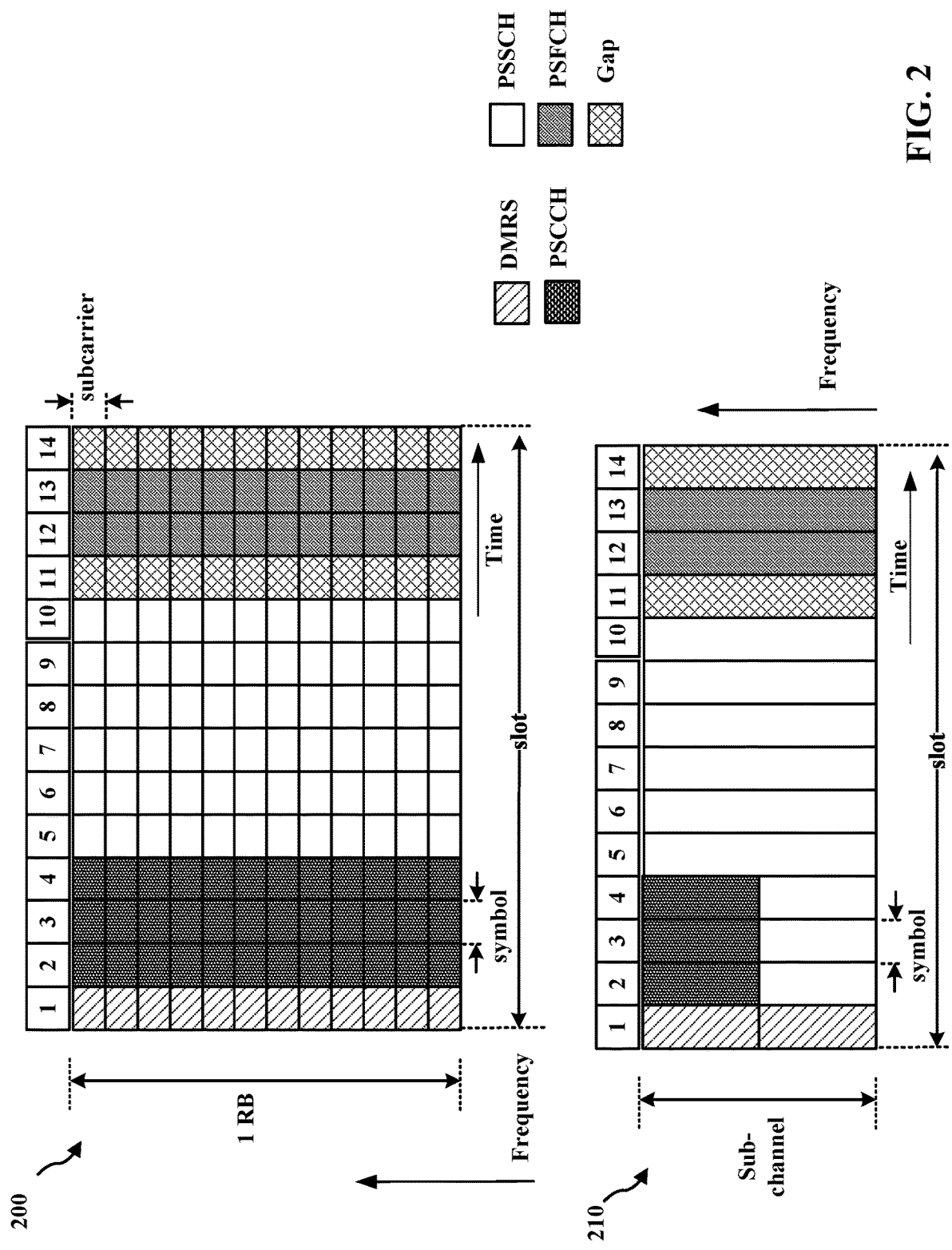
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
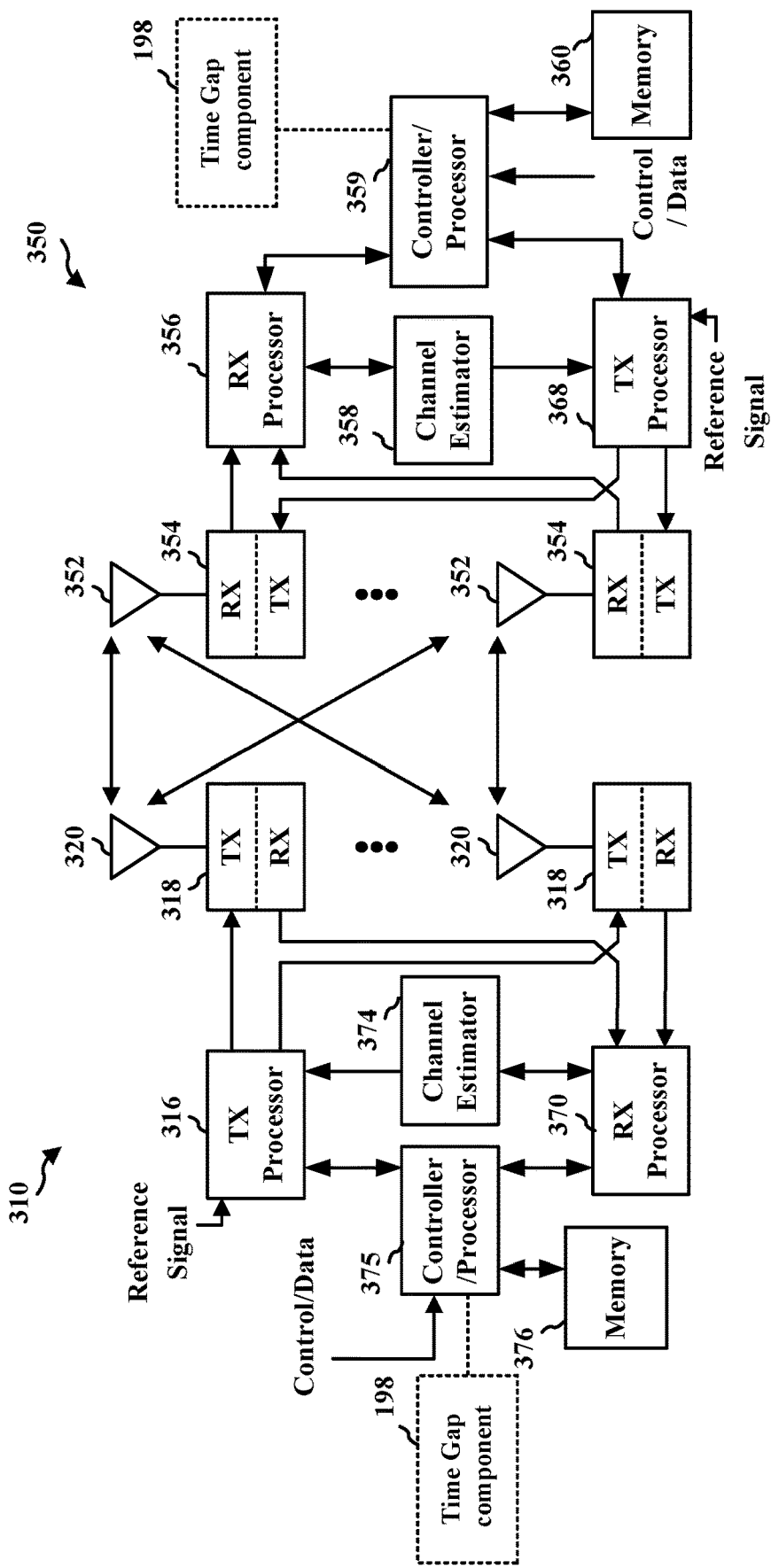
FIG. 3 is a diagram illustrating an example of a first device and a second device involved in wireless communication based, e.g., on sidelink.

FIG. 3 is a block diagram of a first wireless communication device 310 in communication with a second wireless communication device 350. In some examples, the devices 310 and 350 may communicate based on sidelink, such as based on V2X or other D2D communication. The communication may be based exchanged over sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 of FIG. 1.

Figure 4:
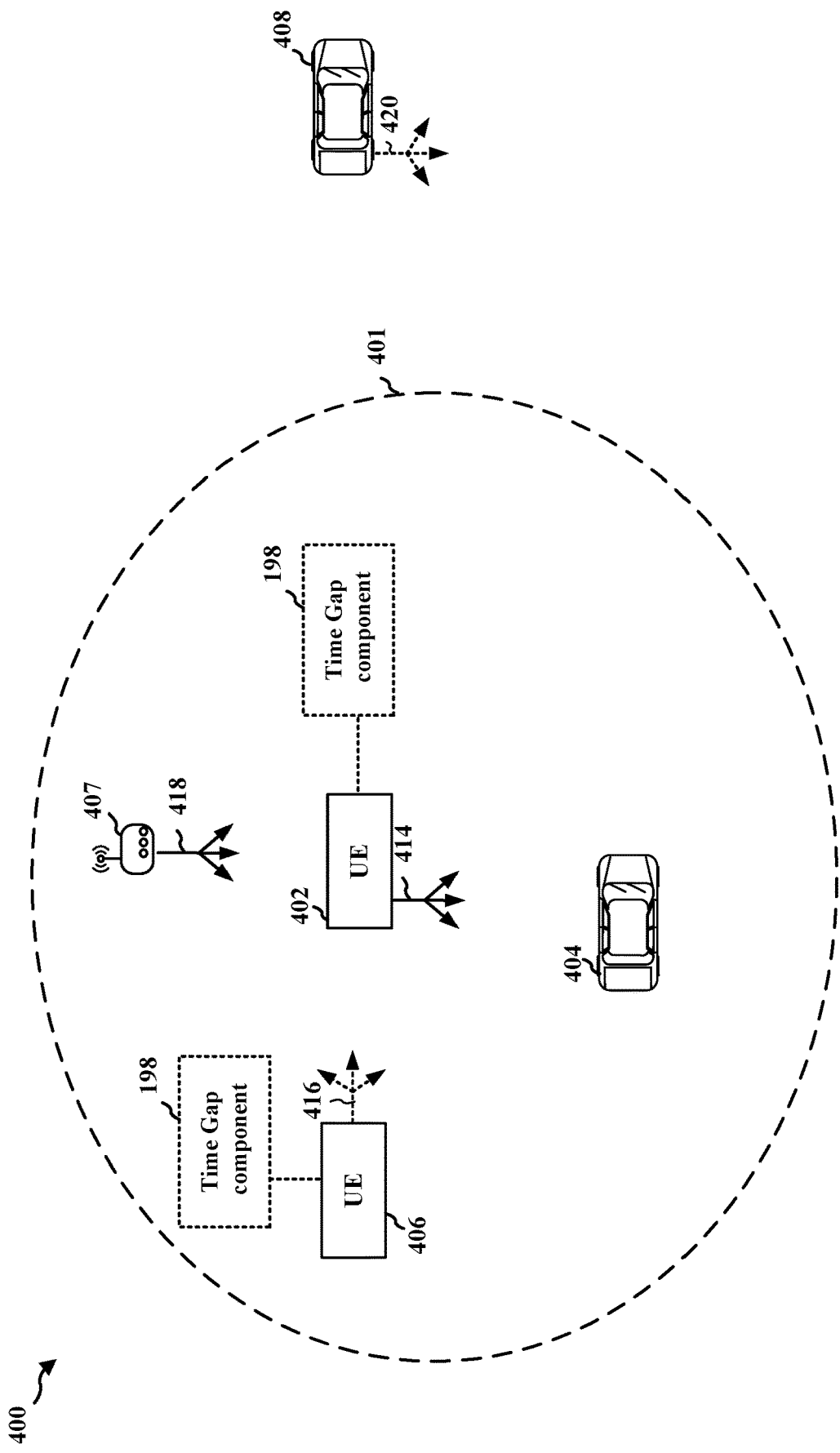
FIG. 4 illustrates an example of communication between wireless devices based on sidelink.

FIG. 4 illustrates an example 400 of sidelink communication between devices, e.g., based on V2X or other D2D communication. The sidelink communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. A control channel, e.g., PSCCH, may include sidelink control information (SCI) with information for decoding a data channel, e.g., PSSCH. The SCI may also be used by a receiving device to avoid interference by refraining from transmitting on the occupied resources or resources reserved by another UE. The UEs 402, 404, 406, 408 may each be capable of operating as a transmitting device in addition to operating as a receiving device. Thus, UEs 406, 408 are illustrated as transmitting a transmissions 416, 420. The transmissions 414, 416, 420 may be broadcast or multicast to nearby devices. For example, UE 414 may transmit communication intended for receipt by other UEs within a range 401 of UE 414. Additionally/alternatively, RSU 407 may receive communication from and/or transmit communication to UEs 402, 404, 406, 408, e.g., as illustrated at 418.

UE 402, 404, 406, 408 or RSU 407 may comprise a time gap component 198, similar to 198 described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a sidelink UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. The sidelink transmission and/or the resource reservation may be periodic or aperiodic, where a UE may reserve resources for transmission in a current slot and up to two future slots (discussed below).

As the radio resource allocation for the sidelink communication may be based on resource reservations, when a UE is preparing to transmit data on a sidelink, the UE may first determine which resources are reserved by other UEs. Then, the UE may select resources from the remaining unreserved resources that are available.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may exclude resources that are used and/or reserved by other UEs, and may select/reserve resources for a transmission from the resources that are unused and remain in the candidate set for sidelink transmissions by the UE (e.g., including the transmission of SCI and/or data). The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
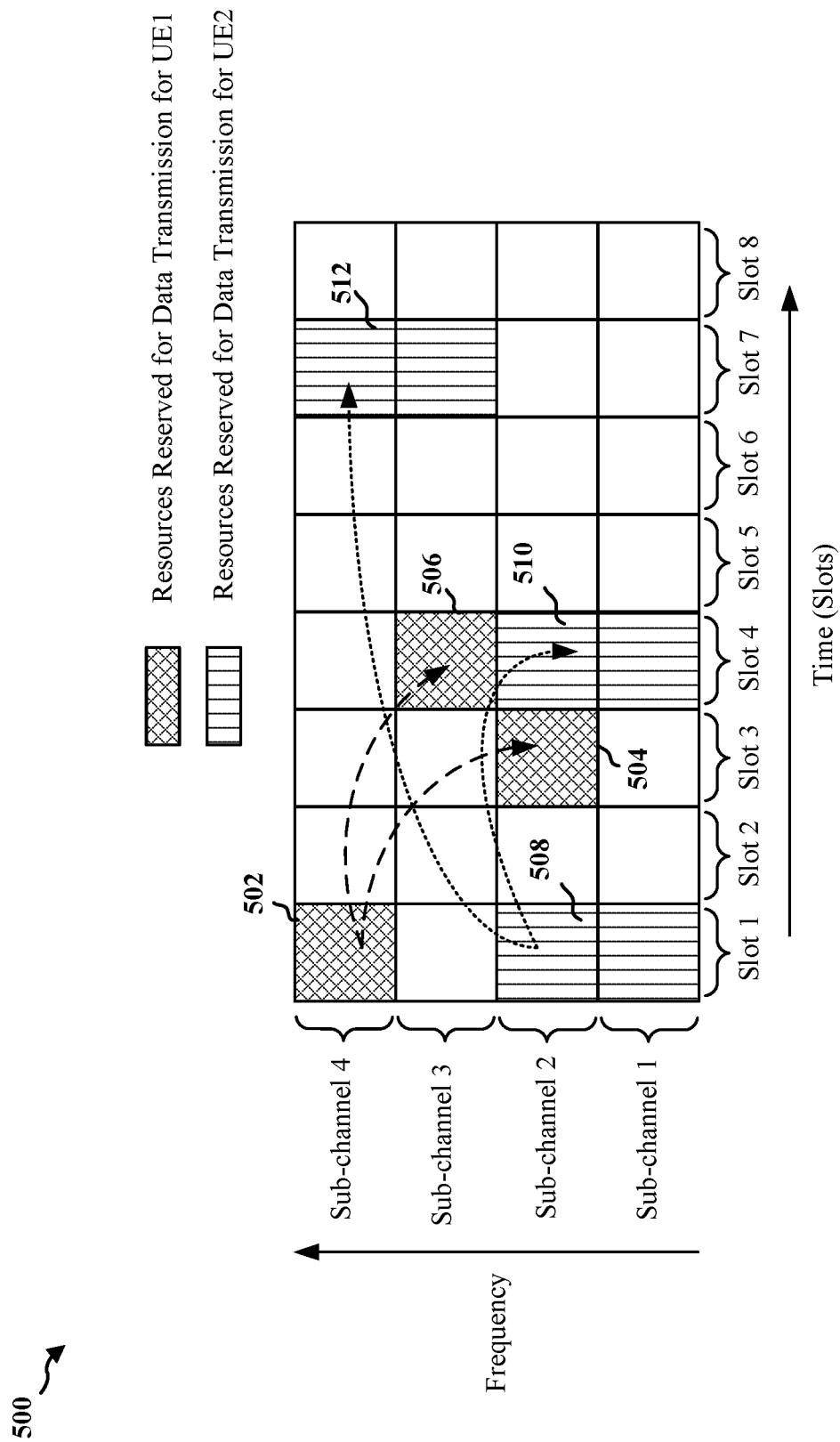
FIG. 5 illustrates an example of resource reservation in sidelink.

FIG. 5 is an example 500 of time frequency resources showing resource reservations for sidelink transmissions. The resources may be comprised in a sidelink resource pool, for example. The resource reservations for each UE may be in units of one or more sub-channels in the frequency domain (e.g., sub-channels 1 to 4), and may be based on one slot in the time domain. A UE may use resources in a first slot to perform an initial transmission, and may reserve resources in future slots, e.g., for retransmissions. In this example, up to two different future slots may be reserved by a particular UE for retransmissions. In some examples, the resource reservation may be within a window of a predefined slots and sub-channels, such as a window including 8 time slots by 4 sub-channels as shown in example 500, which provides 32 available resource blocks in total. This window may also be referred to as a resource selection window. Each resource block in the resource selection window may be used to transmit data and control information.

A first UE may reserve a sub-channel in a current slot for its initial data transmission 502, and may reserve additional future slots within the window for data retransmissions (e.g., 504 and 506). For example, the may reserve sub-channel 2 at slot 3 and sub-channel 3 at slot 4 for future transmissions. In some examples, the future transmissions may comprise retransmissions. The UE may transmit information regarding which resources the UE is using or reserving by including the reservation information in the SCI. In some examples, the reservation information may be included in a reservation resource field of a first stage SCI.

FIG. 5 illustrates that a second UE may similarly reserve resources, e.g., 508, 510, and 512, e.g., by indicating the resource reservation in SCI.

A third may consider the resources reserved by other UEs (e.g., the first UE and the second UE) within the resource selection window to select resources to transmit its data. The third UE may first decode the SCIs to identify which resources are available (e.g., candidate resources). The third UE may exclude the resources reserved by the first UE and the second UE and may select other available sub-channels and time slots from the candidate resources for its transmission and retransmissions.

While FIG. 5 illustrates resources being reserved for an initial transmission and two retransmissions, the reservation may be for different numbers of transmissions. For example, the reservation may be for more than two retransmissions. The reservation may be for an initial transmission and a single transmission. The reservation may be for an initial transmission. Each reservation of resources may have a priority level indicated in the SCI. A higher priority reservation may pre-empt a lower priority reservation. A UE may perform signal/channel measurement for a sidelink resource that has been reserved and/or used by other UE(s), such as by measuring the reference signal receive power (RSRP) of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. Thus, the UE may include the resources in the candidate resources set and may use/reuse the reserved resource for transmission if the RSRP for the reservation is below the threshold. When the measured RSRP is below the threshold, it may indicate that the UE reserving the resource may be distant, and the use/reuse of the reserved resource may be less likely to cause interference or impact to that UE.

The transmitted SCI that reserves resources for a retransmission may include a number of bits indicating a time gap (e.g., a time distance) between the transmission and the retransmission. The time gap may be indicated in a number of slots. In one example, the time gap may be indicated using five bits per reservation. The SCI may indicate up to two reservations per transmission. The number of bits for indicating the time gap may limit the time distance between transmissions, e.g., may limit the distance that can be indicated using the particular number of bits.

The resource reservation may be periodic or aperiodic. In periodic resource reservations, the previous packet may reserve resources for the next packet and/or may reserve resources for the next transmission of the same packet. The UE may indicate the time gap in ms from a current packet to a next packet. If the resource reservation is periodic, the reservation period may be configured to values between 0 ms and 1000 ms by signaling in the SCI, e.g., [0 ms, 1 ms, 2 ms, 3 ms, . . . , 1000 ms].

In some examples, a retransmission based on a periodic resource may also indicate a resource that was used for the previous transmission. The indication may be referred to as a backward indication, for example. At times, a receiving UE may miss the first transmission and may receive the second transmission. The backward indication enables the UE to know the resource for the first transmission. In combination with a periodic reservation and the indication of the resource for the first transmission, the UE may determine or identify the resource for the next packet. For example, by determining the time gap between the current transmission and the first transmission indicated by the backward indication, the UE may determine the period and may identify the distance to the next periodic resource.

While periodic resource reservations may reserve resources up to 1000 ms apart, e.g., having a 1000 ms time gap from the SCI indicating the reservation, aperiodic resource reservations have a more limited time gap, e.g., at most 32 slots. Resource reservations may indicate a time gap of 16-20 slots, for example. A communication system having aperiodic traffic may be more prone to bursty traffic, e.g., traffic having times at which multiple UEs transmit in an overlapping manner. In order to manage aperiodic resources and avoid colliding transmissions from different UEs, the resource selection procedure may chain together selected resources by limiting a time gap between any two resources. For example, the time gap may be limited to at most 32 slots between resource reservations.

System performance with aperiodic resource reservation may be more sensitive to an imperfect timeline at a UE than system performance based on periodic resource reservations. For example, a UE may take a substantial amount of time to perform resource selection, packet preparation, feedback processing, etc. As an example, the UE may use an amount of time between 8-16 slots to determine candidate resources, select resources from the candidate resources, prepare a packet for transmission in the selected resources, and process feedback to determine whether to retransmit the packet. The length of time that the UE uses for selection, preparation, and/or processing time may further limit the possible time gap between two consecutive resource reservations. Thus, while 32 slots may be an upper limit, the UE may experience further limitations in operation. If the additional limitation of the time gap due to added selection, preparation, and processing times is large when compared to the upper limit of 32 slots, the UE may have limited resources to select for reservation. The problem is amplified when a larger subcarrier spacing is used because the larger subcarrier spacing has a smaller slot time. With a smaller slot size, the upper limit of the time gap, e.g., up to 32 slots, also has a smaller length in time.

Figure 6:
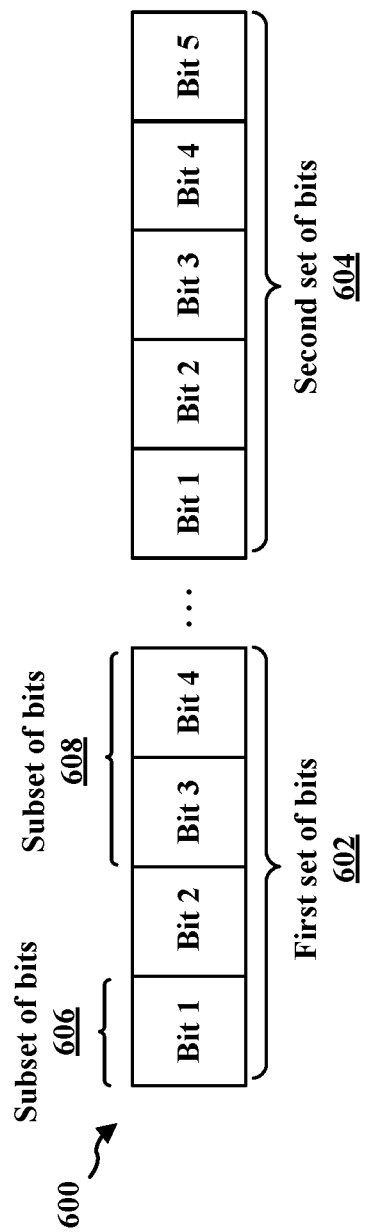
FIG. 6 illustrates an example group of bits carrying information in sidelink control information (SCI).

Aspects presented herein improve time gap signaling for aperiodic resource reservation by using SCI bits that support information about periodic reservations to provide supplemental bits for signaling the time gap between aperiodic resource reservations. For example, a set of bits may be used to signal information about a periodic resource reservation, such as a backward indication for a periodic reservation, whether a reservation is periodic, etc. If the reservation is aperiodic, the set of bits may instead be used to signal the time gap between reserved resources. For example, the set bits may be used in combination with other bits that are used to signal the time gap, e.g., the bits that are used to signal the time gap for both periodic and aperiodic reservations. FIG. 6 illustrates an example group of bits 600 that may be included in SCI to indicate a resource reservation. The group of bits 600 includes a first set of bits 602 that are for indicating information that relates to periodic reservations. In another example, the first set of bits 602 may be used for indicating whether or not the resource reservations is periodic. The group of bits 600 also includes a second set of bits 604 for signaling time gap information. The second set of bits 604 may be used to signal the time gap (e.g., in a number of slots) for aperiodic resource reservations or to signal or to signal the time gap (e.g., in ms) for periodic resource reservations. Aspects presented herein include reusing one or more bits of the first set of bits 602, e.g., in combination with the second set of bits 604, to signal the time gap for an aperiodic resource reservation. In some examples, a subset of bits may be used for backward signaling indicating the resources of a previous transmission for a periodic transmission. For example, the subset of bits may include one bit such as shown at 606, two bits such as shown at 608, etc. As an example, one bit may be used for backward signaling if there is one reservation per transmission, e.g., 2 bits may be used if there are two reservations per transmission. The 1 or 2 bits may be reused in a non-periodic resource reservation to signal the time gap. As another example, one or more of the first set of bits 602 may be used to indicate if the reservation is periodic. In some examples, a single bit may be used. In a non-periodic resource reservation, the bit(s) may be instead used to signal the time gap for the aperiodic resource reservation. Thus, in an example a subset of bits 606 that includes a single bit may be used together with the second set of bits 604 to indicate the time gap for the resource reservation. Although the first set of bits 602 is illustrated as including four bits and the second set of bits 604 is illustrated as five bits, the specific number of bits illustrated in FIG. 6 is merely one example to illustrate the concept. Additionally, the bits may be adjacent/consecutive or may be nonadjacent with intervening bits between the first set of bits 602 and the second set of bits 604. The aspects presented herein may be applied to any number of bits that support signaling for periodic resource reservations.

If the reservation is not periodic, four to six bits from the first set of bits 602 may be used for time gap signaling. The added bits enable longer lengths to be indicated for the time gap. For example, a time gap of up to 128 slots may be indicated rather than being limited to 32 slots. For example, for two reservations per transmission, there may be four extra signaling bits from the first set of bits 602 that can be used to indicate the time gap. Two extra bits may be used per reservation to indicate the corresponding time gap.

In another example, the first set of bits 602 may include a code point that indicates a non-periodic resource reservation, e.g., a reservation period 0. If backward signaling is applied or enabled, the UE may use the backward signaling bits to indicate the time gap. The use of the backward signaling bits may increase the time gap that can be signaled, e.g., from 32 slots to 64 slots. For example, for one reservation per transmission, there may be one bit for backward signaling, which leads to one extra bit for the time gap in aperiodic resource reservation. For two reservations per transmission, there may be two bits for backward signaling, which leads to one extra bit for the time gap in each aperiodic resource reservation.

Figure 7:
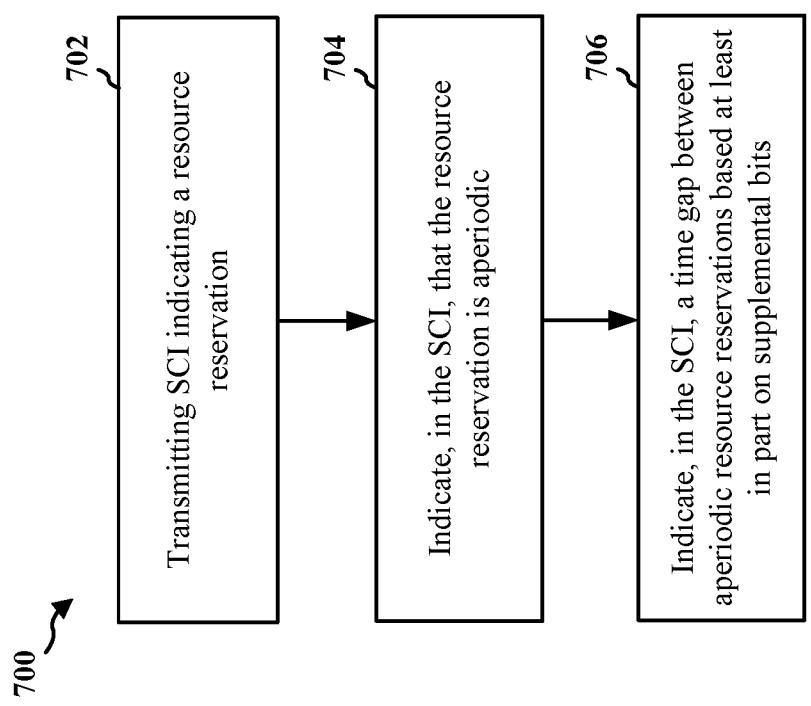
FIG. 7 is a flowchart of a method of wireless communication including the transmission of SCI that indicates a time gap based at least in part on supplemental bits.

FIG. 7 is a flowchart 700 of a method of wireless communication. The method may be performed by a wireless device communicating based on sidelink (e.g., a UE 104, an RSU 107, a device 310, 350; the apparatus 902). The method may improve aperiodic resource reservation by enabling the indication of longer time gaps between reservations.

At 702, the wireless device transmits sidelink control information (SCI) indicating a resource reservation. For example, the wireless device may indicate a resource reservation including any of the aspects described in connection with FIG. 4 or FIG. 5. For example, the transmission may be performed, e.g., by the SCI component 1140 and/or the transmission component 1134 of the apparatus 1102 in FIG. 11.

At 704, the wireless device indicates that the resource reservation is aperiodic. The wireless device may indicate the aperiodic resource reservation in the SCI. In another example, the wireless device may indicate that the resource reservation is aperiodic based on a codepoint that indicates a non-periodic reservation (e.g., reservation period 0).

At 706, the wireless device indicates a time gap between resources for an aperiodic resource reservation based at least in part on supplemental bits. As used herein, supplemental bits may refer to additional bits beyond bits of the SCI that are designated for time gap indication. In some examples, the supplemental bits may include one or more bits that support a periodic resource reservation. For example, the indication may be performed, e.g., by the time gap indication component 1142 of the apparatus 1102 in FIG. 11.

The supplemental bits may include bits that support a backward indication of a previous resource for the periodic resource reservation. The supplemental bits may include a first number of bits if the resource reservation is for a single reservation per transmission and may include a second number of bits if the resource reservation is for multiple reservations per transmission. The supplemental bits may include one or more bits that support indicating whether the resource reservation is periodic. The time gap may be indicated with a combination of the supplemental bits that support a periodic resource reservation and additional bits for time gap signaling. For example, as described in connection with FIG. 6, the time gap may be indicated in a combination of one or more of the first set of bits 602 and the second set of bits 604. In another example, the wireless device may indicate that the resource reservation is aperiodic based on a codepoint that indicates a non-periodic reservation (e.g., reservation period 0). One or more of the bits of the SCI may indicate a codepoint for a non-periodic reservation. For example, a subset of the first set of bits in FIG. 6 may indicate the codepoint and one or more of the remaining bits may be used to indicate the time gap indicated in the SCI. The time gap may be indicated based on a subset of bits that support a backward indication, e.g., the backward indication of a previous resource for the periodic reservation.

Figure 8:
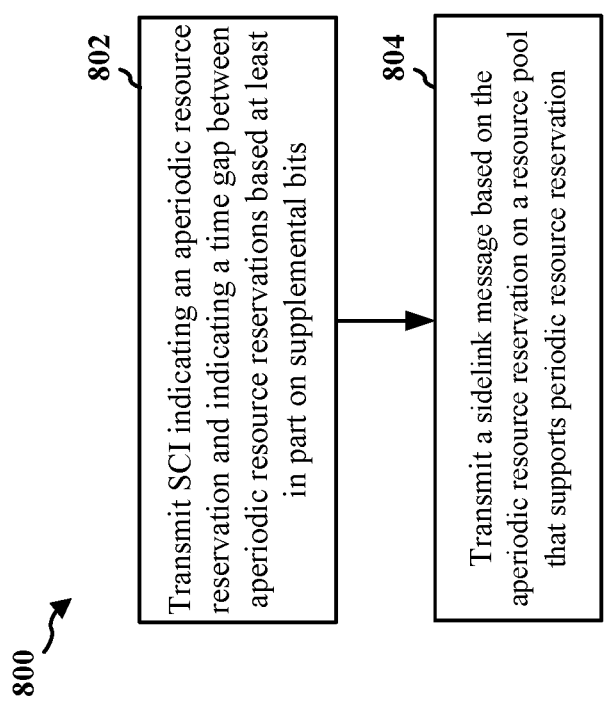
FIG. 8 is a flowchart of a method of wireless communication including the transmission of SCI that indicates a time gap based at least in part on supplemental bits.

FIG. 8 is a flowchart 800 of a method of wireless communication. The method may be performed by a wireless device communicating based on sidelink (e.g., a UE 104, an RSU 107, a device 310, 350; the apparatus 1102). The method may improve aperiodic resource reservation by enabling the indication of longer time gaps between reservations.

At 802, the wireless device transmits sidelink control information (SCI) indicating an aperiodic resource reservation and indicating a time gap between resources for an aperiodic resource reservation based at least in part on supplemental bits. In some aspects, the wireless device may indicate that the resource reservation is aperiodic based on a codepoint that indicates a non-periodic reservation (e.g., reservation period 0). For example, the wireless device may indicate a resource reservation including any of the aspects described in connection with FIG. 4 or FIG. 5. For example, the transmission of the SCI may be performed, e.g., by the SCI component 1140 and/or the transmission component 1134 of the apparatus 1102 in FIG. 11. In some examples, the supplemental bits may include one or more bits that support a periodic resource reservation. For example, the indication may be performed, e.g., by the time gap indication component 1142 of the apparatus 1102 in FIG. 11.

The supplemental bits may include bits that support a backward indication of a previous resource for the periodic resource reservation. The supplemental bits may include a first number of bits if the resource reservation is for a single reservation per transmission and may include a second number of bits if the resource reservation is for multiple reservations per transmission. The supplemental bits may include one or more bits that support indicating whether the resource reservation is periodic. The time gap may be indicated with a combination of the supplemental bits that support a periodic resource reservation and additional bits for time gap signaling. For example, as described in connection with FIG. 6, the time gap may be indicated in a combination of one or more of the first set of bits 602 and the second set of bits 604. In another example, the wireless device may indicate that the resource reservation is aperiodic based on a codepoint that indicates a non-periodic reservation (e.g., reservation period 0). One or more of the bits of the SCI may indicate a codepoint for a non-periodic reservation. For example, a subset of the first set of bits in FIG. 6 may indicate the codepoint and one or more of the remaining bits may be used to indicate the time gap indicated in the SCI. The time gap may be indicated based on a subset of bits that support a backward indication, e.g., the backward indication of a previous resource for the periodic reservation.

At 804, the wireless device transmits a sidelink message based on the aperiodic resource reservation on a resources pool that supports periodic resource reservation. For example, the wireless device may transmit the sidelink message as described in connection with any of FIGS. 3-6. As described in connection with claim 5, the UE may transmit the sidelink message based on the resources reserved in the SCI transmission.

Figure 9:
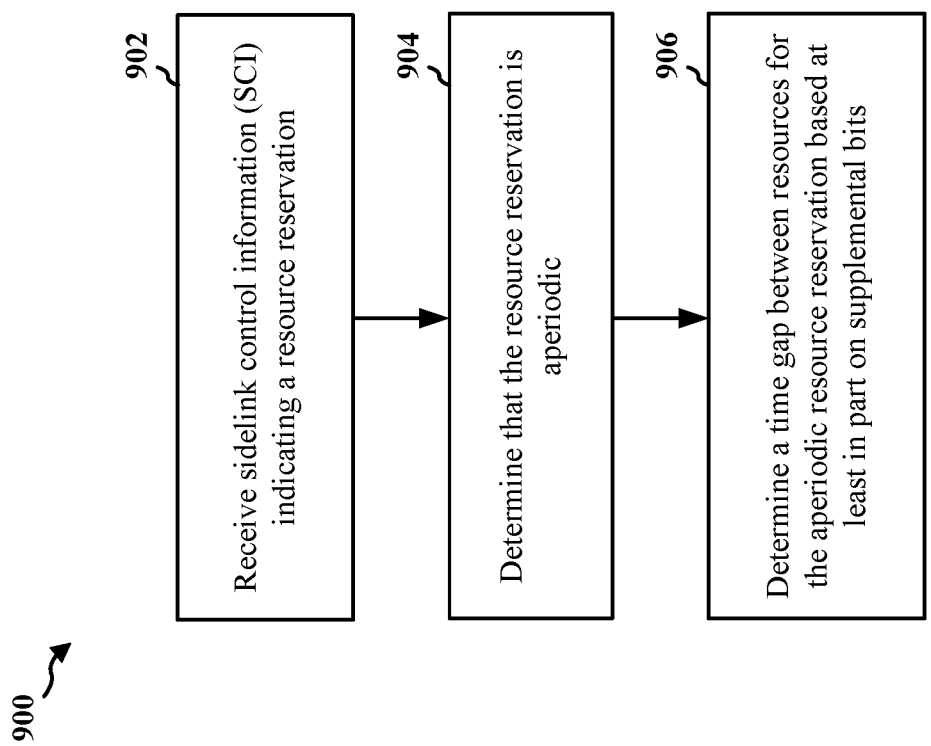
FIG. 9 is a flowchart of a method of wireless communication including the reception of SCI that indicates a time gap based at least in part on supplemental bits.

FIG. 9 is a flowchart 900 of a method of wireless communication. The method may be performed by a wireless device communicating based on sidelink (e.g., a UE 104, an RSU 107, a device 310, 350; the apparatus 1102). The method may improve aperiodic resource reservation by enabling a determination of longer time gaps between reservations.

At 902, the wireless device receives SCI indicating a resource reservation. For example, the resource reservation may include any of the aspects described in connection with FIG. 4 or FIG. 5. For example, the reception may be performed, e.g., by the SCI component 1140 and/or the reception component 1130 of the apparatus 1102 in FIG. 11.

At 904, the wireless device determines that the resource reservation is aperiodic. For example, the wireless device may determine that the resource reservation is aperiodic based on the SCI not indicating that the resource reservation is periodic. In another example, the wireless device may determine that the resource reservation is aperiodic based on a codepoint that indicates a non-periodic reservation (e.g., reservation period 0). One or more of the bits of the SCI may indicate a codepoint for a non-periodic reservation. For example, a subset of the first set of bits in FIG. 6 may indicate the codepoint and one or more of the remaining bits may be used to determine the time gap indicated in the SCI, as described in connection with 906. For example, the determination may be performed, e.g., by the aperiodic determination component 1144 of the apparatus 1102 in FIG. 11.

At 906, the wireless device determines a time gap between resources for the aperiodic resource reservation based at least in part on supplemental bits. In some examples, the supplemental bits may include one or more bits that support a periodic resource reservation. The supplemental bits may include bits that support a backward indication of a previous resource for the periodic resource reservation. The supplemental bits may include a first number of bits if the resource reservation is for a single reservation per transmission and may include a second number of bits if the resource reservation is for multiple reservations per transmission. The supplemental bits may include one or more bits that support indicating whether the resource reservation is periodic. The time gap may be indicated with a combination of the supplemental bits and additional bits for time gap signaling. For example, as described in connection with FIG. 6, the time gap may be indicated in a combination of one or more of the first set of bits 602 and the second set of bits 604. The time gap may be indicated based on a subset of bits that support a backward indication, e.g., the backward indication of a previous resource for the periodic reservation. For example, the determination may be performed, e.g., by the time gap determination component 1146 of the apparatus 1102 in FIG. 11.

Figure 10:
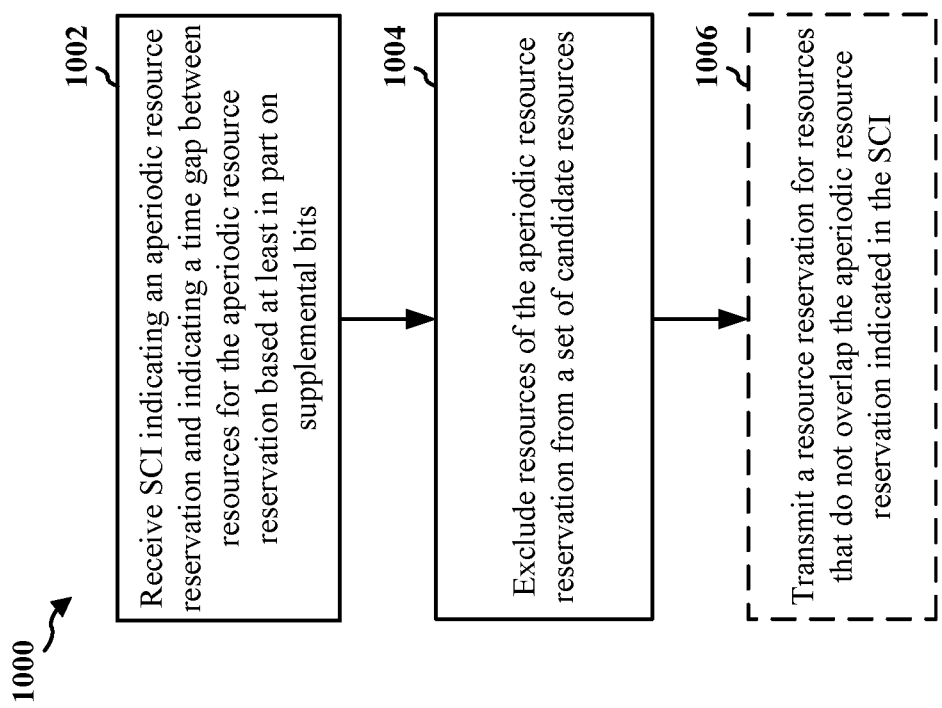
FIG. 10 is a flowchart of a method of wireless communication including the reception of SCI that indicates a time gap based at least in part on supplemental bits.

FIG. 10 is a flowchart 1000 of a method of wireless communication. The method may be performed by a wireless device communicating based on sidelink (e.g., a UE 104, an RSU 107, a device 310, 350; the apparatus 1102). The method may improve aperiodic resource reservation by enabling a determination of longer time gaps between reservations.

At 1002, the wireless device receives SCI indicating an aperiodic resource reservation and indicating a time gap between resources for the aperiodic resource reservation based at least in part on supplemental bits. For example, the resource reservation may include any of the aspects described in connection with FIG. 4 or FIG. 5. For example, the reception may be performed, e.g., by the SCI component 1140 and/or the reception component 1130 of the apparatus 1102 in FIG. 11. The SCI may enable the device to determine that the resource reservation is aperiodic. For example, the wireless device may determine that the resource reservation is aperiodic based on the SCI not indicating that the resource reservation is periodic. In another example, the wireless device may determine that the resource reservation is aperiodic based on a codepoint that indicates a non-periodic reservation (e.g., reservation period 0). One or more of the bits of the SCI may indicate a codepoint for a non-periodic reservation. For example, a subset of the first set of bits in FIG. 6 may indicate the codepoint and one or more of the remaining bits may be used to determine the time gap indicated in the SCI. For example, the determination may be performed, e.g., by the aperiodic determination component 1144 of the apparatus 1102 in FIG. 11.

The SCI received at 1002 may also enable the device to determine a time gap between resources for the aperiodic resource reservation based at least in part on supplemental bits. In some examples, the supplemental bits may include one or more bits that support a periodic resource reservation. The supplemental bits may include bits that support a backward indication of a previous resource for the periodic resource reservation. The supplemental bits may include a first number of bits if the resource reservation is for a single reservation per transmission and may include a second number of bits if the resource reservation is for multiple reservations per transmission. The supplemental bits may include one or more bits that support indicating whether the resource reservation is periodic. The time gap may be indicated with a combination of the supplemental bits and additional bits for time gap signaling. For example, as described in connection with FIG. 6, the time gap may be indicated in a combination of one or more of the first set of bits 602 and the second set of bits 604. The time gap may be indicated based on a subset of bits that support a backward indication, e.g., the backward indication of a previous resource for the periodic reservation. For example, the determination may be performed, e.g., by the time gap determination component 1146 of the apparatus 1102 in FIG. 11.

At 1004, the device excludes the resources of the aperiodic resource reservation from a set of candidate resources. The resource exclusion may be performed, e.g., by the candidate resource set component 1148 of the apparatus 1102 in FIG. 11. The exclusion may be based on any of the aspects described in connection with FIG. 5, for example. As an example, the candidate resources may be for allocation mode 2, or a distributed allocation mode.

At 1006, the device may transmit a resource reservation for resources that do not overlap the aperiodic resource reservation indicated in the SCI. For example, the transmission of the resource reservation may be performed by the SCI component 1140 via the transmission component 1134 of the apparatus 1102 in FIG. 11. The resource reservation may be transmitted in SCI, e.g., as described in connection with FIGS. 4, 5, 6, 7, and/or 8.

Figure 11:
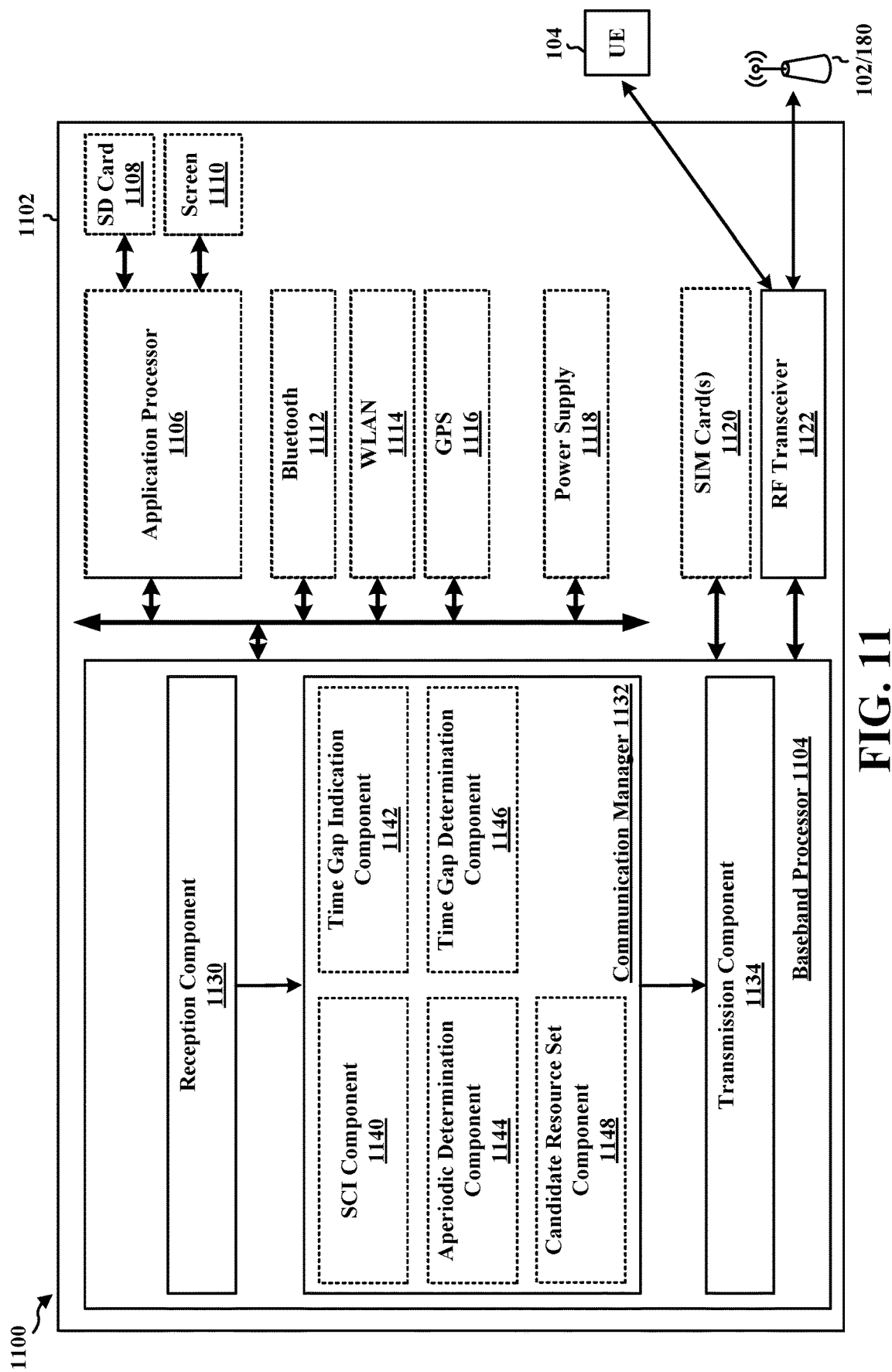
FIG. 11 is a diagram illustrating an example of a hardware implementation for an example apparatus.

FIG. 11 is a diagram 1100 illustrating an example of a hardware implementation for an apparatus 1102. The apparatus 1102 is a wireless device that communications based on sidelink, such as a UE or a component of a UE, and includes a baseband processor 1104 (also referred to as a modem) coupled to a RF transceiver 1122. The apparatus may include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and/or a power supply 1118. The baseband processor 1104 communicates through the RF transceiver 1122 with the UE 104 and/or BS 102/180. The baseband processor 1104 may include a computer-readable medium/memory. The baseband processor 1104 is responsible for general processing, including the execution of software stored on the computer-readable medium/memory. The software, when executed by the baseband processor 1104, causes the baseband processor 1104 to perform the various functions described supra. The computer-readable medium/memory may also be used for storing data that is manipulated by the baseband processor 1104 when executing software. The baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband processor 1104. The baseband processor 1104 may be a component of the wireless device 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see the device 310 or 350 of FIG. 3) and include the additional modules of the apparatus 1102.

The apparatus may include additional components that perform each of the blocks of the algorithm in any of flowcharts of FIGS. 7-10. For example, the apparatus 1102 may include the SCI component 1140 and/or the time gap indication component 1142 may be configured to transmit resource reservations to other UEs 104, such as described in connection with 702-706 FIG. 7 and/or 802 in FIG. 8. In some aspects, the SCI component 1140 may be configured to receive SCI indicating a resources reservation, as in 902, and determine that the resource reservation is aperiodic, as in 904 in FIG. 9. The time gap determination component 1146 may be configured to determine a time gap between resources for the aperiodic resource reservation based at least in part on the supplemental bits, e.g., as described in connection with 906 in FIG. 9. In some aspects, the SCI component 1140 and the time gap determination component 1146 may be configured to receive SCI indicating an aperiodic resource reservation and indicating a time gap between resources the aperiodic resource reservation based at least in part on supplemental bits, e.g., as described in connection with 1002 in FIG. 10. The apparatus 1102 may include a candidate resource set component 1148 that is configured to maintain a candidate resource set for sidelink transmission, such as described in connection with FIGS. 4 and 5. The candidate resource set component 1148 may be configured to exclude resources of the aperiodic resource reservation from a set of candidate resources, e.g., as described in connection with FIG. 10. The transmission component 1134 may be configured to transmit a resource reservation for resources that do not overlap the aperiodic resource reservation indicated in the SCI, e.g., as described in connection with FIG. 5 and/or 1006 in FIG. 10. As such, each block in the flowcharts of any of FIGS. 7-10 may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband processor 1104, includes means for performing any of the aspects described in connection with the method of any of FIGS. 7-10. For example, the apparatus may include means for transmitting sidelink control information (SCI) indicating a resource reservation, means for indicating, in the SCI, that the resource reservation is aperiodic, and means for indicating, in the SCI, a time gap between aperiodic resource reservations based at least in part on supplemental bits. The apparatus 1102 may include means for transmitting SCI indicating an aperiodic resource reservation and indicating a time gap between aperiodic resource reservations based at least in part on supplemental bits. The apparatus 1102 may further include means for transmitting a sidelink message based on the aperiodic resource reservation on a resource pool that supports periodic resource reservation. The apparatus 1102 may include means for receiving SCI indicating a resource reservation. The apparatus 1102 may include means for determining that the resource reservation is aperiodic and means for determining a time gap between resources for the aperiodic resource reservation based at least in part on supplemental bits. The apparatus 1102 may include means for receiving SCI indicating an aperiodic resource reservation and indicating a time gap between resources for the aperiodic resource reservation based at least in part on supplemental bits and means for excluding resources of the aperiodic resource reservation from a set of candidate resources. The apparatus 1102 may further include means for transmitting a resource reservation for resources that do not overlap the aperiodic resource reservation indicated in the SCI. The means may be one or more of the components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following example aspects are illustrative only and aspects thereof may be combined with aspects of other examples or teaching described herein, without limitation.

Aspect 1 is a method of wireless communication at a wireless device, comprising: transmitting sidelink control information (SCI) indicating a resource reservation; indicating, in the SCI, that the resource reservation is aperiodic; and indicating, in the SCI, a time gap between aperiodic resource reservations based at least in part on supplemental bits.

Aspect 2 is a method of wireless communication at a wireless device, comprising transmitting SCI indicating an aperiodic resource reservation and indicating a time gap between aperiodic resource reservations based at least in part on supplemental bits; and transmitting a sidelink message based on the aperiodic resource reservation on a resource pool that supports periodic resource reservation.

In aspect 3, the method of aspect 1 or aspect 2 further includes that the supplemental bits include one or more bits that support information about a periodic resource reservation.

In aspect 4, the method of any of aspects 1-3 further includes that the supplemental bits include bits that support a backward indication of a previous resource for the periodic resource reservation.

In aspect 5, the method of any one of aspects 1-4 further includes that the supplemental bits includes a first number of bits if the resource reservation is for a single reservation per transmission and includes a second number of bits if the resource reservation is for multiple reservations per transmission.

In aspect 6, the method of any one of aspects 1-5 further includes that the supplemental bits includes one or more bits that support indicating whether the resource reservation is periodic.

In aspect 7, the method of any one of aspects 1-6 further includes that the time gap is indicated with a combination of the supplemental bits that support a periodic resource reservation and bits for time gap signaling.

In aspect 8, the method of any one of aspects 1-7 further includes that one or more of the bits of the SCI indicate a codepoint for a non-periodic reservation.

Aspect 9 is a device including one or more processors and one or more memories in electronic communication with the one or more processors storing instructions executable by the one or more processors to cause the device to implement a method as in any of aspects 1-8.

Aspect 10 is a system or apparatus including means for implementing a method or realizing an apparatus as in any of aspects 1-8.

Aspect 11 is a non-transitory computer readable storage medium storing instructions executable by one or more processors to cause the one or more processors to implement a method as in any of aspects 1-8.

Aspect 12 is a method of wireless communication at a wireless device, comprising: receiving SCI indicating a resource reservation; determining that the resource reservation is aperiodic; and determining a time gap between resources for the aperiodic resource reservation based at least in part on supplemental bits.

Aspect 13 is a method of wireless communication at a wireless device, comprising receiving SCI indicating an aperiodic resource reservation and indicating a time gap between resources for the aperiodic resource reservation based at least in part on supplemental bits; and excluding resources of the aperiodic resource reservation from a set of candidate resources.

In aspect 14, the method of aspect 12 or aspect 13 further includes transmitting a resource reservation for resources that do not overlap the aperiodic resource reservation indicated in the SCI.

In aspect 15, the method of any to aspects 12-14 further includes that the supplemental bits include one or more bits that support information about a periodic resource reservation.

In aspect 16, the method of any of aspects 12-15 further includes that the supplemental bits includes one or more bits that support a backward indication of a previous resource for the periodic resource reservation.

In aspect 17, the method of any one of aspects 12-16 further includes that the supplemental bits includes a first number of bits if the resource reservation is for a single reservation per transmission and includes a second number of bits if the resource reservation is for multiple reservations per transmission.

In aspect 18, the method of any one of aspects 12-17 further includes that the supplemental bits includes one or more bits that support indicating that the resource reservation is periodic.

In aspect 19, the method of any one of aspects 12-18 further includes that the time gap is indicated with a combination of the supplemental bits and additional bits for time gap signaling.

In aspect 20, the method of any one of aspects 12-19 further includes that one or more of the bits of the SCI indicate a codepoint for a non-periodic reservation.

Aspect 21 is a device including one or more processors and one or more memories in electronic communication with the one or more processors storing instructions executable by the one or more processors to cause the device to implement a method as in any of aspects 12-20.

Aspect 22 is a system or apparatus including means for implementing a method or realizing an apparatus as in any of aspects 12-20.

Aspect 23 is a non-transitory computer readable storage medium storing instructions executable by one or more processors to cause the one or more processors to implement a method as in any of aspects 12-20.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at wireless device, comprising:
   a memory; and
   at least one processor coupled to the memory, the at least one processor and the memory being configured to:
      transmit sidelink control information (SCI) indicating an aperiodic resource reservation and indicating a time gap between aperiodic resource reservations based at least in part on supplemental bits that include one or more bits that support information about a periodic resource reservation; and
      transmit aperiodic sidelink messages based on the aperiodic resource reservation and the indicated time gap between the aperiodic resource reservations.

2. The apparatus of claim 1, wherein the at least one processor is configured to transmit the aperiodic sidelink messages on a resource pool that supports the periodic resource reservation.

3. The apparatus of claim 1, wherein the supplemental bits include bits that support a backward indication of a previous resource for the periodic resource reservation.

4. The apparatus of claim 1, wherein the supplemental bits include a first number of bits if a resource reservation is for a single reservation per transmission and includes a second number of bits if the resource reservation is for multiple reservations per transmission.

5. The apparatus of claim 1, wherein the supplemental bits include at least one bit that supports indicating that a resource reservation is periodic or aperiodic.

6. The apparatus of claim 1, wherein the time gap is indicated with a combination of the supplemental bits that support the periodic resource reservation and bits for time gap signaling.

7. The apparatus of claim 1, wherein at least one bit of the SCI indicates a codepoint for a non-periodic reservation.

8. A method of wireless communication at a wireless device, comprising:
   transmitting sidelink control information (SCI) indicating an aperiodic resource reservation and indicating a time gap between aperiodic resource reservations based at least in part on supplemental bits that include one or more bits that support information about a periodic resource reservation; and
   transmitting aperiodic sidelink messages based on the aperiodic resource reservation and the indicated time gap between the aperiodic resource reservations.

9. The method of claim 8, wherein the aperiodic sidelink messages are transmitted on a resource pool that supports the periodic resource reservation.

10. The method of claim 8, wherein the supplemental bits include bits that support a backward indication of a previous resource for the periodic resource reservation.

11. The method of claim 8, wherein the supplemental bits include a first number of bits if a resource reservation is for a single reservation per transmission and includes a second number of bits if the resource reservation is for multiple reservations per transmission.

12. The method of claim 8, wherein the supplemental bits include at least one bit that supports indicating whether a resource reservation is periodic.

13. The method of claim 8, wherein the time gap is indicated with a combination of the supplemental bits that support the periodic resource reservation and bits for time gap signaling.

14. The method of claim 8, wherein at least one bit of the SCI indicates a codepoint for a non-periodic reservation.

15. An apparatus for wireless communication at a wireless device, comprising:
a memory; and
at least one processor coupled to the memory, the at least one processor and the memory being configured to:
receive sidelink control information (SCI) indicating an aperiodic resource reservation and indicating a time gap between resources for the aperiodic resource reservation based at least in part on supplemental bits that include one or more bits that support information about a periodic resource reservation; and
exclude resources of the aperiodic resource reservation from a set of candidate resources based on the aperiodic resource reservation and the indicated time gap between the aperiodic resource reservations.

16. The apparatus of claim 15, wherein the memory and the at least one processor are further configured to:
transmit a resource reservation for resources that do not overlap the aperiodic resource reservation indicated in the SCI.

17. The apparatus of claim 15, wherein the supplemental bits include at least one bit that supports a backward indication of a previous resource for the periodic resource reservation.

18. The apparatus of claim 15, wherein the supplemental bits include a first number of bits if a resource reservation is for a single reservation per transmission and includes a second number of bits if the resource reservation is for multiple reservations per transmission.

19. The apparatus of claim 15, wherein the supplemental bits include at least one bit that supports indicating that a resource reservation is periodic.

20. The apparatus of claim 15, wherein the time gap is indicated with a combination of the supplemental bits and additional bits for time gap signaling.

21. The apparatus of claim 15, wherein at least one bit of the SCI indicates a codepoint for a non-periodic reservation.

22. A method of wireless communication at a wireless device, comprising:
receiving sidelink control information (SCI) indicating an aperiodic resource reservation and indicating a time gap between resources for the aperiodic resource reservation based at least in part on supplemental bits that include one or more bits that support information about a periodic resource reservation; and
excluding resources of the aperiodic resource reservation from a set of candidate resources based on the aperiodic resource reservation and the indicated time gap between the aperiodic resource reservations.

23. The method of claim 22, further comprising:
transmitting a resource reservation for resources that do not overlap the aperiodic resource reservation indicated in the SCI.

24. The method of claim 22, wherein the supplemental bits include at least one bit that supports a backward indication of a previous resource for the periodic resource reservation.

25. The method of claim 22, wherein the supplemental bits include a first number of bits if a resource reservation is for a single reservation per transmission and includes a second number of bits if the resource reservation is for multiple reservations per transmission.

26. The method of claim 22, wherein the supplemental bits include at least one bit that supports indicating that the resource reservation is periodic.

27. The method of claim 22, wherein the time gap is indicated with a combination of the supplemental bits and additional bits for time gap signaling.

28. The method of claim 22, wherein at least one bit of the SCI indicate a codepoint for a non-periodic reservation.

* * * * *